(12) United States Patent
Young et al.

(10) Patent No.: US 6,623,391 B2
(45) Date of Patent: Sep. 23, 2003

(54) BLADE-TYPE MECHANICAL CHAIN TENSIONER WITH EXTERNAL STRENGTHENING RIB

(75) Inventors: James D. Young, Chesaning, MI (US); Anthony S. Ferenc, Goodrich, MI (US)

(73) Assignee: Cloyes Gear and Products, Inc., Mentor, OH (US)

(*) Notice: Subject to any disclaimer, the term of this patent is extended or adjusted under 35 U.S.C. 154(b) by 0 days.

(21) Appl. No.: 09/981,044

(22) Filed: Oct. 16, 2001

(65) Prior Publication Data

US 2002/0045503 A1 Apr. 18, 2002

Related U.S. Application Data

(60) Provisional application No. 60/241,047, filed on Oct. 17, 2000.

(51) Int. Cl.[7] .................................................. F16H 7/08
(52) U.S. Cl. ....................... 474/111; 474/101; 474/109; 474/140
(58) Field of Search ................................ 474/101, 109, 474/111, 140

(56) References Cited

U.S. PATENT DOCUMENTS

| 1,172,716 | A | * | 2/1916 | Turner ........................ 84/50 |
| 4,921,472 | A | | 5/1990 | Young |
| 5,266,066 | A | | 11/1993 | White |
| 5,286,234 | A | | 2/1994 | Young |
| 5,318,482 | A | | 6/1994 | Sato et al. |
| 5,425,680 | A | | 6/1995 | Young |
| 5,711,732 | A | | 1/1998 | Ferenc et al. |

FOREIGN PATENT DOCUMENTS

| DE | 30 49 106 A1 | 7/1982 |
| FR | 2 276 514 | 1/1976 |

* cited by examiner

Primary Examiner—Thomas R. Hannon
Assistant Examiner—Vicky A. Johnson
(74) Attorney, Agent, or Firm—Fay, Sharpe, Fagan, Minnich & McKee, LLP

(57) ABSTRACT

A chain tensioner apparatus includes a mounting bracket adapted for connection to an associated engine block. The mounting bracket defines a pivot point and a support surface. A blade is connected to the bracket and includes: (i) first and second opposite end portions joined together by a central portion; (ii) a hub defined by the first end portion; and, (iii) a first end wall connecting the hub to the central portion. The hub of the blade is pivotably connected to the bracket at the pivot point and the second end of the blade abuts the support surface. The blade defines an exterior chain guide surface adapted for slidingly abutting an associated chain of an associated chain drive system. The chain tensioner apparatus further includes a tensioning spring connected to the blade, the spring having opposite first and second ends located respectively adjacent the first and second opposite end portions of the blade. The spring contacts and exerts a biasing force on the central portion of the blade. A rib projects outwardly away from the first end wall of the blade. The rib comprises a first end located adjacent the central portion of the blade and a second end located adjacent the hub. The blade and spring, without the mounting bracket, define a blade/spring sub-assembly.

22 Claims, 7 Drawing Sheets

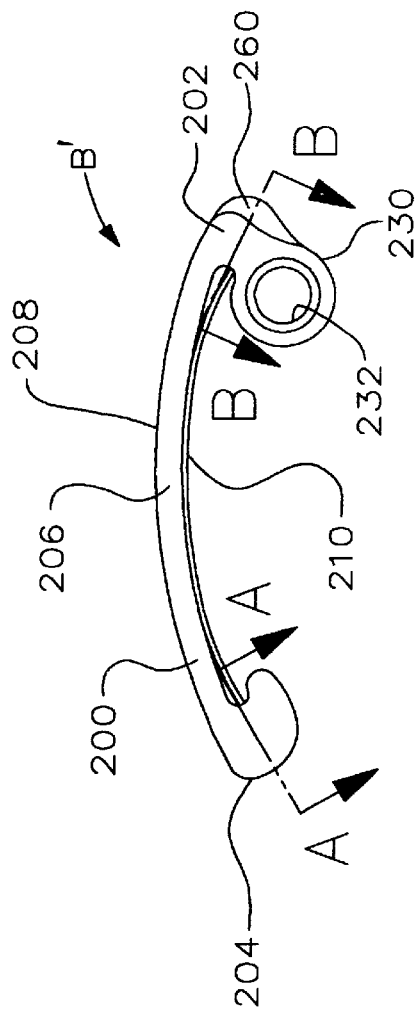
FIG. 6B
FIG. 6
FIG. 6A

BLADE-TYPE MECHANICAL CHAIN TENSIONER WITH EXTERNAL STRENGTHENING RIB

CROSS-REFERENCE TO RELATED APPLICATION

This application claims priority from and hereby expressly incorporates by reference U.S. provisional application No. 60/241,047 filed Oct. 17, 2000.

BACKGROUND OF THE INVENTION

The present invention relates generally to the automotive chain drive art and, more particularly, to a chain tensioner apparatus useful in confined spaces for applying a tensioning force to a chain traveling therepast. Several prior patents describe various chain tensioner devices that include a chain engaging blade or shoe member, typically molded from a resinous plastic material, having a metal spring installed therein to provide the shoe sub-assembly with the necessary rigidity and damping characteristics while taking advantage of the flexibility, low friction, and good wear properties of the plastic shoe. For example, commonly assigned U.S. Pat. No. 5,286,234, the disclosure of which is hereby expressly incorporated by reference, discloses a chain tensioner in which a metal spring is inserted in the longitudinal slot of the shoe. A bracket is provided for operably affixing the spring/shoe sub-assembly to an engine block. A first (pivot) end of the spring/shoe sub-assembly is pivotably secured to the bracket by a pin or fastener. The opposite (free) end of the spring/shoe sub-assembly is supported on a ramp. The bracket defines an up-turned tab portion adjacent the ramp. The tab portion, ramp and base wall of the bracket cooperate to define a channel that holds the free end of the spring/shoe sub-assembly but that allows for reciprocation on same on the ramp. The bracket thus maintains the shoe in its proper position with respect to the plane of the chain path while permitting sliding motion of the shoe free end on the ramp along with the related rotational movement of the shoe at the pivot end. An object of the arrangement disclosed in the '234 patent is to retain the spring within the shoe spring slot while keeping the shoe in its proper position. In particular, the spring is properly retained in that its movement is limited in one direction by the side wall of the bracket and in the opposite direction by the shoe, itself.

U.S. Pat. No. 5,711,732, the disclosure of which is hereby expressly incorporated by reference, discloses a chain tensioner wherein the bracket is not used to retain the spring. Such an arrangement is required because applications exist where it is not feasible for the bracket base wall to be used for spring retention purposes. Spring retention for the device disclosed in the '732 patent is achieved by mechanically interlocking the spring to the shoe. In one arrangement, the spring defines open slots at its opposite ends. The shoe defines a longitudinal slot that opens in a rear face thereof for receiving the spring, and a retaining ridge is defined by a central projection at each end of the longitudinal slot. The retaining ridges at the opposite longitudinal ends of the slot respectively engage the slots defined in opposite ends of the spring so that the spring is releasably and fixedly secured in the slot. As with the '234 patent, the slot is closed by a front face of the shoe so that the spring is prevented from exiting the slot in a first direction by the front face of the shoe and in a second direction by the mechanical interlock arrangement just described.

In an alternative embodiment disclosed in the '732 patent, a central rib feature (male adapter) is provided at one end of the slot and accords positive spring retention in the shoe while at the same time beneficially permitting a more narrow part width at this end of the shoe (see FIG. 17). Notably, this central rib is connected to, and extends from, the top surface of the slot to the bottom surface, i.e., the rib spans the slot. The T-section provided by this central rib provides necessary structural integrity for the shoe and spring sub-assembly.

The blade-type mechanical tensioners disclosed in the '234 and '732 patents have been found to be highly effective and have enjoyed widespread commercial success. However, finite element analysis and empirical data have shown the existence of a high stress area at the end of the central rib and the blade juncture at the pivot end (where the central rib spans the slot), and the stress levels can be particularly high when the blade width is narrow and the blade length is short. For some applications having a more restricted width and length packaging envelope, the above described blade-type chain tensioners may not have the capability to apply a required tensioning force, or may not have the required blade flexure and strength. Accordingly, it has been deemed desirable to develop a new and improved blade-type chain tensioner that will function properly in a more confined environment and that will overcome the forgoing deficiencies and others while providing better overall performance.

SUMMARY OF THE INVENTION

In accordance with a first aspect of the present invention, a blade and spring sub-assembly apparatus for use in a chain tensioner of a chain drive system is provided. The apparatus comprises a blade having first and second opposite end portions joined together by a central portion. The blade defines an exterior chain guide surface adapted for slidingly abutting an associated chain of an associated chain drive system. A tensioning spring is connected to the blade and has opposite first and second ends located respectively adjacent the first and second opposite end portions of the blade. The spring contacts and exerts a biasing force on the central portion of the blade. A hub is defined by the first end portion of the blade. The hub is connected to the central portion of the blade by a first end wall and defines a through-bore adapted for receipt of an associated pin for pivotably connecting the blade to an associated mounting bracket. A rib projects outwardly away from the first end wall. The rib comprises a first end located adjacent the central portion of the blade and a second end located adjacent the hub.

In accordance with another aspect of the present invention, a chain tensioner apparatus comprises a mounting bracket adapted for connection to an associated engine block. The mounting bracket defines a pivot point and a support surface. The chain tensioner apparatus further includes a blade comprising: (i) first and second opposite end portions joined together by a central portion; (ii) a hub defined by the first end portion; and, (iii) a first end wall connecting the hub to the central portion. The hub of the blade is pivotably connected to the bracket at the pivot point and the second end of the blade abuts the support surface. The blade defines an exterior chain guide surface adapted for slidingly abutting an associated chain of an associated chain drive system. The chain tensioner apparatus further includes a tensioning spring connected to the blade, the spring having opposite first and second ends located respectively adjacent the first and second opposite end portions of the blade. The spring contacts and exerts a biasing force on the central portion of the blade. A rib projects outwardly away from the first end wall of the blade. The rib comprises a first end located adjacent the central portion of the blade and a second end located adjacent the hub.

One advantage of the present invention resides in the provision of a new and improved blade-type mechanical chain tensioner exhibiting improved strength, durability, and effectiveness in a confined application.

Another advantage of the present invention resides in the provision of a blade-type mechanical chain tensioner wherein the effective length of the spring-receiving slot and the effective length of the flexing portion of the blade (shoe) is maximized without undesirably weakening the shoe.

Still another advantage of the present invention resides in the provision of a blade-type mechanical chain tensioner wherein the spring can be retained in the slot defined by the shoe by either a mechanical interlock with the shoe or by the bracket to which the shoe is connected.

Still other benefits and advantages of the present invention will become apparent to those of ordinary skill in the art to which the invention pertains upon reading this specification.

BRIEF DESCRIPTION OF THE DRAWINGS

A blade-type mechanical chain tensioner formed in accordance with the present invention comprises various components and arrangements of components, preferred embodiments of which are illustrated in the accompanying drawings that form a part hereof and wherein:

FIG. 6 illustrates a blade/spring sub-assembly formed in accordance with an alternative embodiment of the present invention; and, FIGS. 6A and 6B are sectional views taken along lines A—A and B—B of FIG. 6, respectively.

DETAILED DESCRIPTION OF PREFERRED EMBODIMENTS

Figure 1:
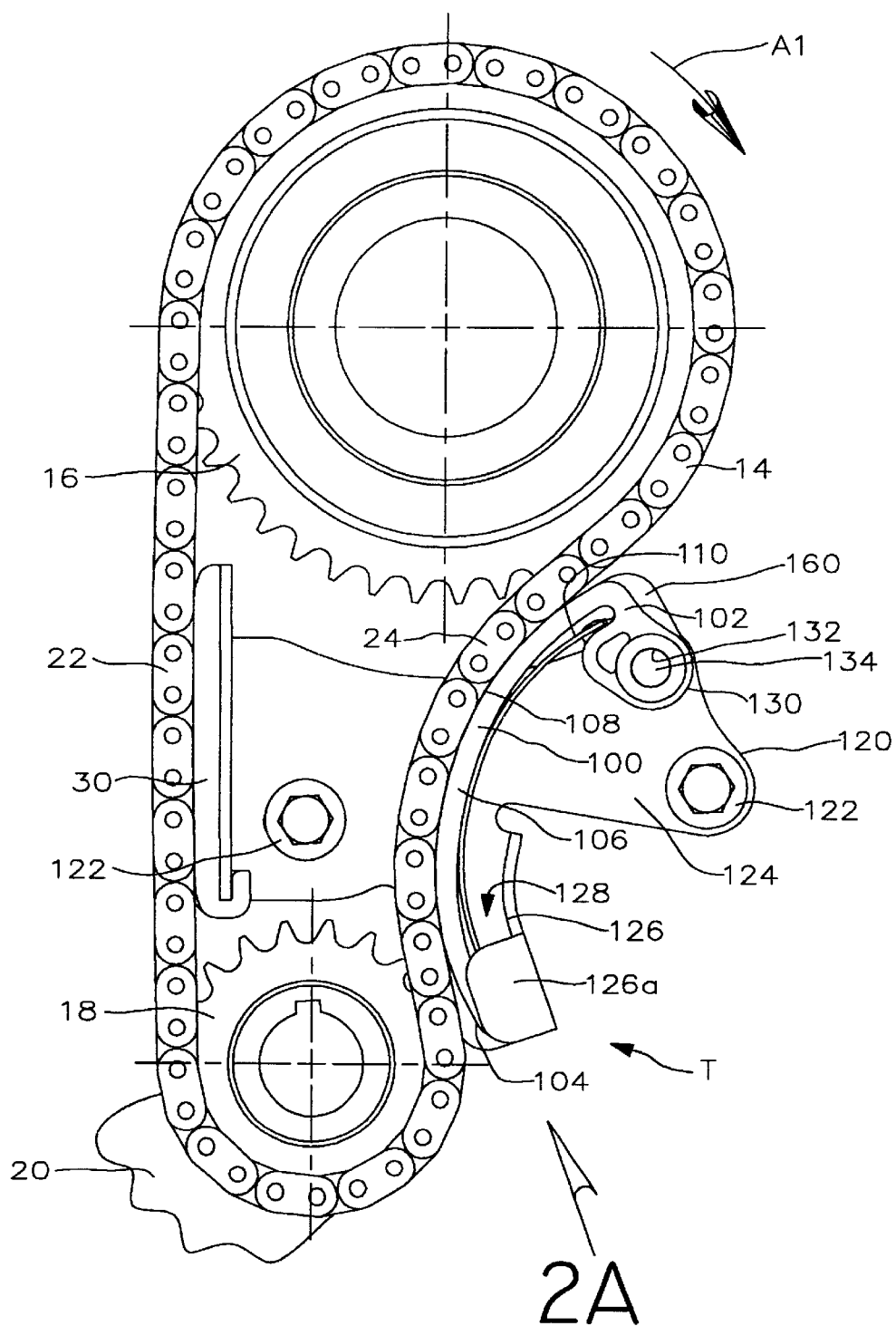
FIG. 1 is a front plan view of a chain drive system including a blade-type mechanical chain tensioner formed in accordance with the present invention.

Referring now to the drawings, which are for purposes of illustrating preferred embodiments only and not for purposes of limiting the scope of the present invention in any way, FIG. 1 illustrates a chain drive system that incorporates a chain tensioner T formed in accordance with the present invention. The following description with reference to FIG. 1 is intended to provide a general overview of a tensioner T formed in accordance with the present invention and its operation. Extensive details concerning the structure, installation and operation of a tensioner formed in accordance with the present invention are set forth below with reference also to FIGS. 2A–6B.

With reference to FIG. 1, the chain drive system comprises a chain 14 rotatably operable between a pair of spaced sprockets 16 and 18 respectively mounted on shafts (not shown) in a first engine structure 20. The chain 14 engages and wraps about the larger drive sprocket 16 and a smaller driven sprocket 18 and has two spans extending between the sprockets, taut strand 22 and slack strand 24. In the illustrated embodiment, the drive sprocket 16 rotates in a clockwise direction as indicated by the arrow A1 so that the taut strand 22 is in tension while the slack strand 24 is relaxed. A fixed chain guide 30 is often affixed to the engine structure 20 for the purpose of guiding the taut strand 22. A chain tensioner, such as the tensioner T, is used to tension the slack strand 24 as required to prevent its uncontrolled movement and the resulting damage to the chain 14 and the sprockets 16, 18.

The tensioner T comprises a heat stabilized plastic or a filled-plastic or resinous shoe or blade 100 having first and second opposite end portions 102, 104 joined by a relatively thin and flexible central section 106. A first exterior guide surface 108 extends substantially or entirely the length of the blade 100 between the first end 102 and the second end 104. The guide surface 108 is relatively smooth and curved such that it is adapted to properly engage or contact the slack strand 24. The tensioner T further comprises a tensioning spring 110 connected to the blade 100 as described in full detail below in order to apply the necessary tensioning force to the slack strand 24. In general, the ends 102, 104 of the blade define respective slots 112, 114 (see also FIGS. 2–4D) into which the spring 110 is inserted. The spring exerts a biasing force on the flexible central section 106 of the blade 100 so that the guide surface 108 is urged into contact with the slack strand and so that the blade and spring B absorbs or eliminates all looseness in the slack strand.

The tensioner T further comprises a bracket 120 to which the blade 100 is affixed as described herein. The bracket 120 is, in turn, fixedly secured to the engine 20 by bolts 122 or other means (in the illustrated embodiment, the fixed chain guide 30 is also affixed to the bracket 120). The bracket 120 is preferably defined by a one-piece metal stamping or the like and includes a pin 134, typically resistance welded to the bracket and located at a pivot end thereof, to provide for shoe support and rotation capability. In particular, the first end 102 of the blade is pivotably connected to the bracket. The first end 102 of the blade 100 defines a hub portion 130 (that can be defined to have any shape) including a through-bore 132 (see also FIGS. 2A–4D). The pin 134 can also be a bolt or other fastener or fastening means connected to or that forms a part of the bracket 120.

Figure 2A:
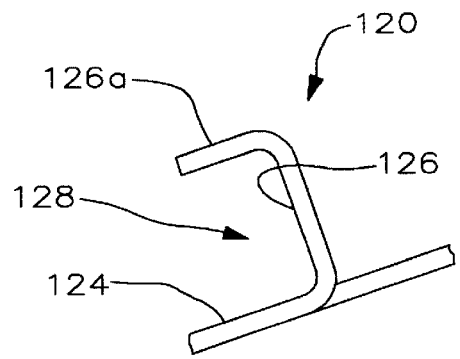
FIG. 2A is a view of the tensioner mounting bracket only taken along the arrow 2A in FIG. 1.
Figure 2B:
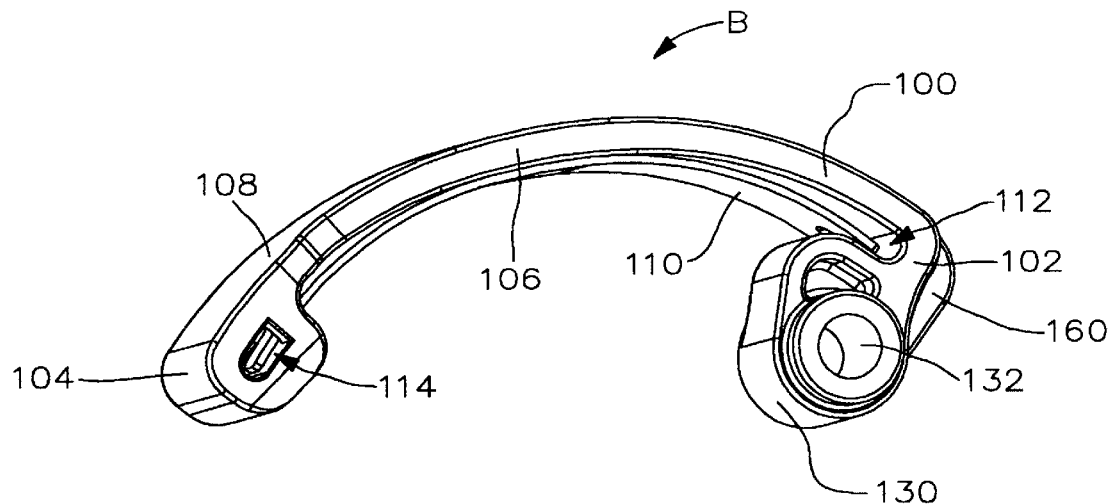
FIG. 2B is an isometric view of the blade/spring sub-assembly of the tensioner shown in FIG. 1 and formed in accordance with the present invention.

The bracket also defines a support surface such as a ramp 126 as shown. With reference also to FIG. 2A, an outermost end of the ramp 126, in relation to the base wall 124 of the bracket, includes or defines an upturned tab 126a so that a channel 128 is defined between the tab 126a and the base wall 124 of the bracket 120. As illustrated in FIG. 1, the second or free end 104 of the blade 100 is located in the channel 128.

Figure 4:
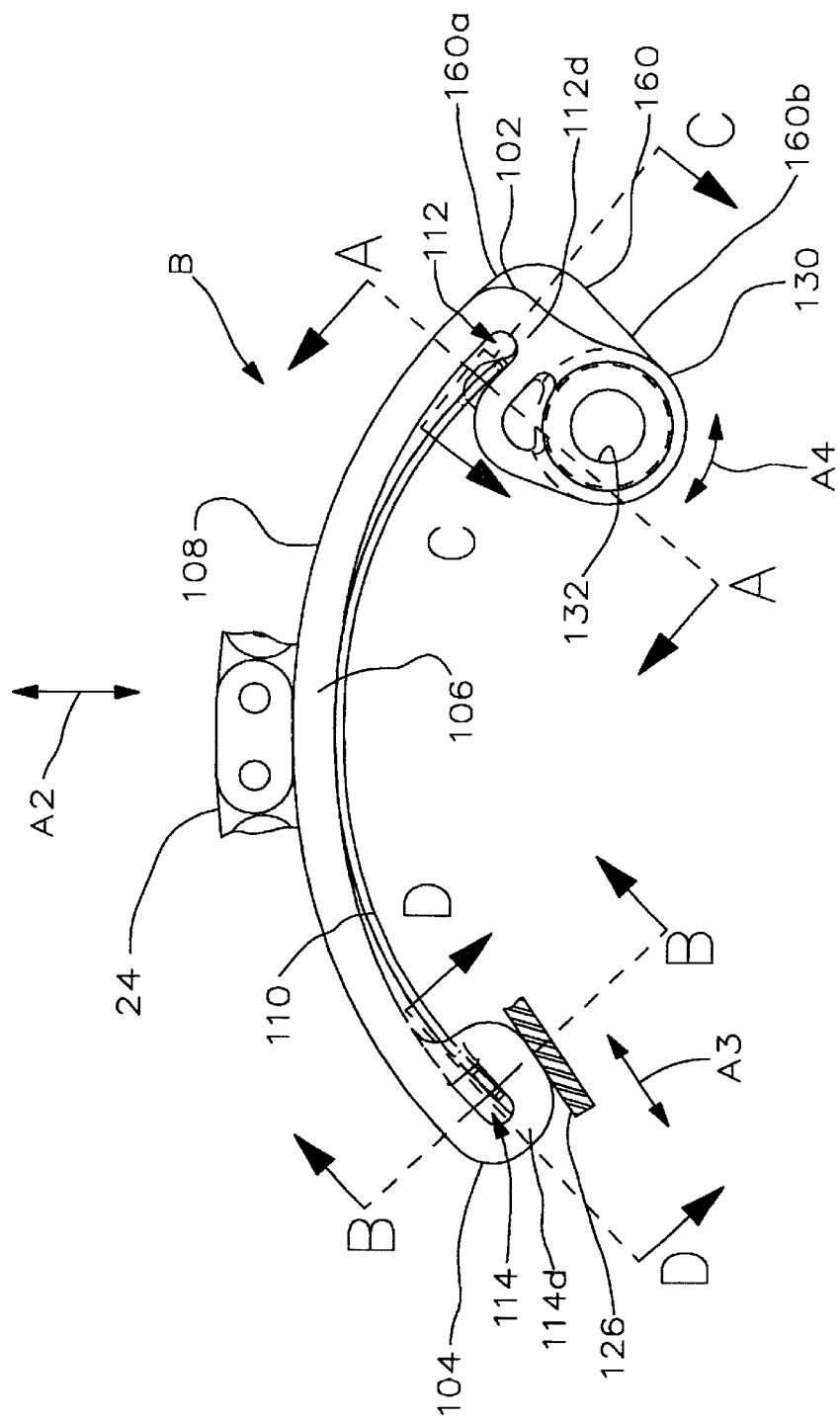
FIG. 4 is a front elevational view of the blade/spring sub-assembly shown in FIG. 2B.

Referring to FIG. 4, the chain drive system dynamics during running operation will often include torsional vibration at one or both shafts thereby causing the slack strand 24 to exert oscillating or pulsating forces on the blade/spring sub-assembly B (further defined below) as indicated by the arrow A2. In response to these forces, the central flexible section 106 of the blade 100 flexes to accommodate the load.

As a result, the blade 100 flattens somewhat as the second end 104 slides in the channel 128 on the ramp 126 away from the first end 102 and the first end 102 rotates about the pin 134. When the force exerted by the slack strand 24 subsides, the spring 110 urges the blade 100 back to its original shape so that the slack strand remains substantially in contact with the guide surface 108 at all times and so that the slack strand is tensioned at all times as required. This sliding and pivoting motion of the blade is represented in FIG. 4 by the arrows A3 and A4, respectively.

The blade 100 and spring 110 together define a blade/spring subassembly B that is illustrated in further detail in FIG. 2B and FIGS. 4 and 4A–4D. As may be seen most clearly with reference to FIGS. 4A and 4B, the blade/spring sub-assembly B comprises a first projection 150 located in the first slot 112 and a second projection 152 located in the second slot 114. The first projection 150 projects upwardly from a first inner or floor surface 112a that defines the first slot 112 and is spaced from (not connected to) the first outer or ceiling surface 112b defining the slot 112. Likewise, the second projection 152 projects upwardly from a second inner or floor surface 114a defining the second slot 114 and is spaced from (not connected to) the second outer or ceiling surface 114b defining the second slot 114. It should also be noted that, while the second floor and ceiling surfaces 114a, 114b of the slot 114 are interconnected by both a front wall 114c, and an end wall 114d, the first floor and ceiling surfaces 112a, 112b of the slot 112 are completely disconnected with the exception of the end wall 112d that is required to connect the central section 106 of the blade 100 to the hub 130. As such, the inner and outer surfaces 112a, 112b defining the slot 112 are free to move toward and away from each other during loading and flexing of the central section 106 of the blade 100 as described above which provides an increased effective length of the blade central section 106. While it is advantageous to maximize blade length, particularly in confined packaging environments, this must be achieved without sacrificing the structural integrity of the blade pivot end portion 102 in order to have the required part strength and durability.

To add strength to the end wall 112d, at least one external rib 160 is provided at the first end 102 of the blade 100 projecting outwardly away from the end wall 112d as shown in FIG. 4. The rib 160 has a first end 160a located adjacent the flexible central portion 106 and a second end 160b located adjacent the hub 130. In particular each rib, such as the single rib 160 shown herein, extends from the guide surface 108 to the hub 130 and is smoothly blended in to both the guide surface 108 and the hub 130 to eliminate stress concentration zones. The rib 160 also preferably defines a smoothly curved outermost surface 162 and the rib 160 is also preferably centrally located between the front and rear faces 100a, 100b of the blade 100 (see FIGS. 5A, 5B). Also, it is most preferred that the maximum height of the rib 160, relative to the end wall 112d, be generally aligned with the portion of the end wall 112d that defines the first slot 112 as shown herein.

Figure 3A:
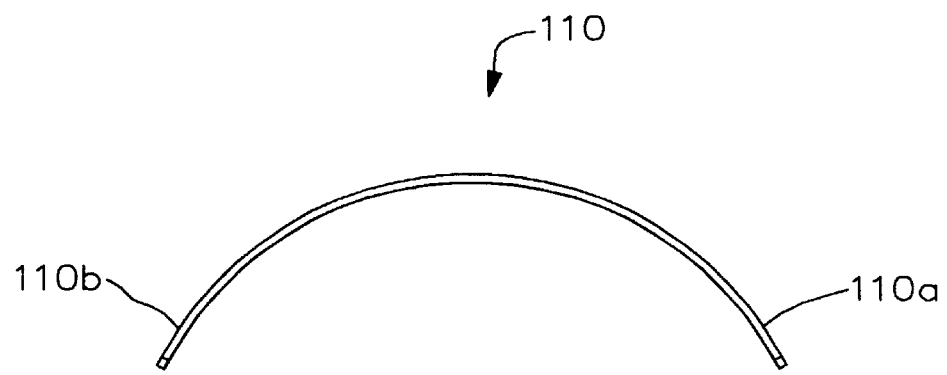
FIG. 3A is a front elevational view of a spring that forms a part of the chain tensioner shown in FIG. 3.
Figure 3B:
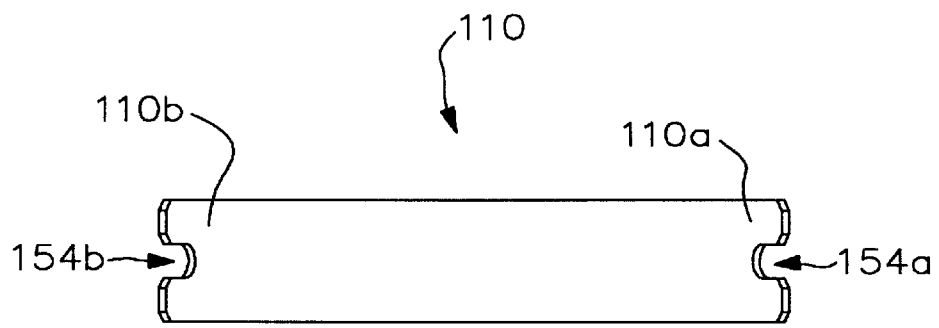
FIG. 3B is a bottom plan view of the spring shown in FIG. 3A.
Figure 4A:
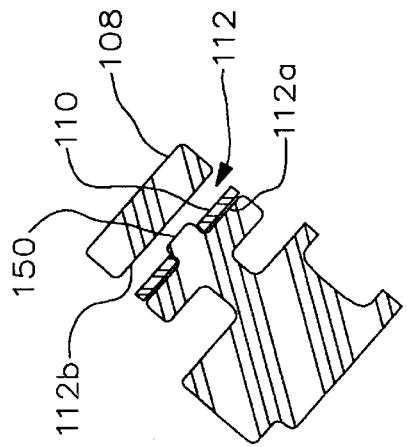
FIGS. 4A–4D are sectional views taken along lines A—A, B—B, C—C and D—D of FIG. 4, respectively.
Figure 4B:
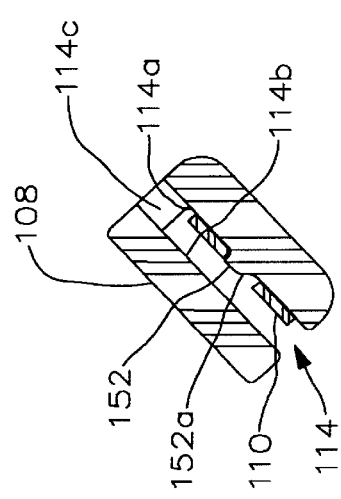
Figure 4C:
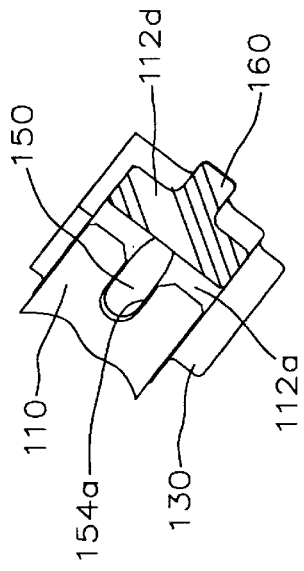
Figure 4D:
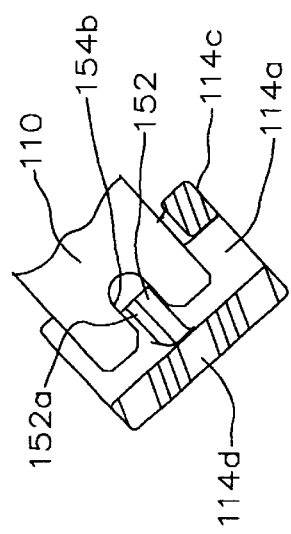

With brief reference to FIGS. 3A and 3B, the spring 110 has opposite first and second ends 110a, 110b. The ends 110a, 110b define respective first and second slots 154a, 154b that are adapted to receive and engage the projections 150, 152 defined by the blade 100. More particularly, as shown in FIGS. 4 and 4A, the slot 154a defined at the end 110a of the spring 110 receives the projection 150 so that the end 110a of the spring 110 is releasably retained in the slot 112. Similarly, the slot 154b defined at the end 110b of the spring 110 receives the projection 152 so that the end 110b of the spring 110 is releasably retained in the slot 114, respectively.

Figure 5A:
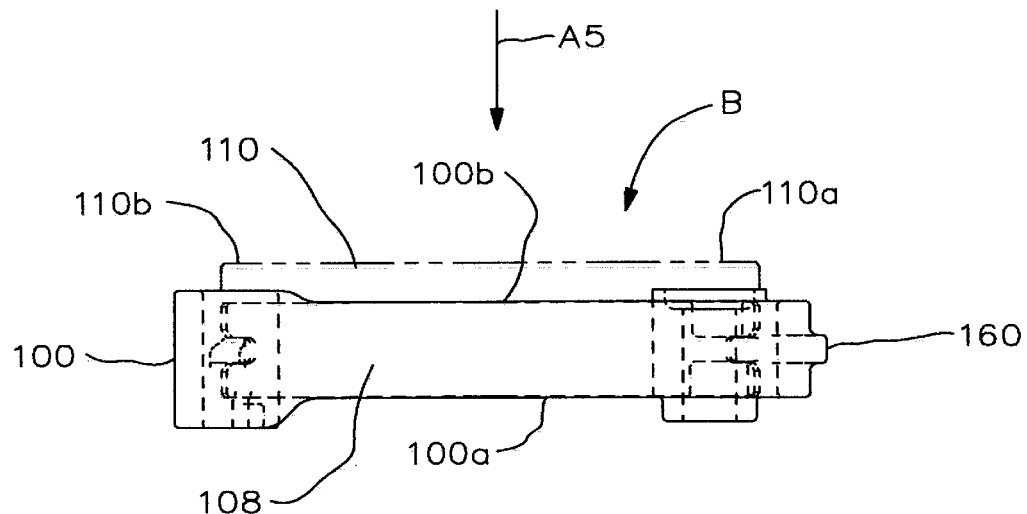
FIGS. 5A and 5B diagrammatically illustrate two different methods for installing the spring of FIGS. 3A and 3B into a tensioner blade formed in accordance with the present invention to construct a blade/spring sub-assembly as illustrated in FIGS. 2B and 4.
Figure 5B:
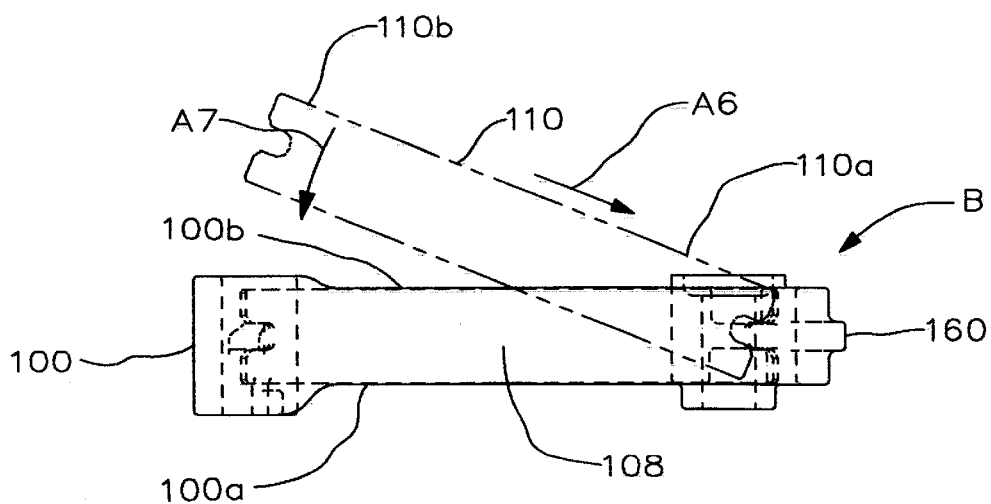

Installation of the spring 110 in this manner is illustrated in FIGS. 5A and 5B. A first installation method is illustrated in FIG. 5A wherein the ends 110a, 110b of the spring are moved respectively into the slots 112, 114 simultaneously as indicated by the arrow A5. FIG. 5B illustrates an alternative spring installation method wherein, in an initial step, the first end 110a is pushed into the slot 112 as shown by the arrow A6 so that the projection 150 is received in the slot 154a. Thereafter, the second end 110b of the spring is pivoted into the slot 114 as indicated by the arrow A7.

To facilitate these installation operations, either the projection 150 and/or the projection 152 can be unilaterally ramped as is generally known in the art. In the illustrated embodiment, the projection 152 is ramped and, thus, includes the sloped surface 152a that facilitates sliding movement of the spring end 110b into the slot 114. Owing to the open construction of the slot 112, the projection 150 is not ramped (and extends well above the spring 110) and this ensures that the spring will not slide out of the slot 112 during use. With the illustrated embodiment, the spring installation method illustrated in FIG. 5B may be deemed preferable relative to that shown in FIG. 5A. However, those of ordinary skill in the art will note that projection 150 could be ramped in the same manner as the projection 152 without departing from the overall scope and intent of the present invention.

FIGS. 6, 6A and 6B illustrate a blade/spring sub-assembly B' formed in accordance with a second embodiment of the present invention. Except as otherwise shown and described, the blade/spring sub-assembly B' is identical to the blade/spring sub-assembly B, and like components are identified with like reference numerals that are 100 greater than those used in relation to the sub-assembly B. The sub-assembly B' includes a blade 200 and a spring 210. The spring includes opposite ends 210a, 210b received in the slots 212, 214. The slots 212, 214 do not include any projections to engage the spring 210 and, thus, the ends 210a, 210b of the spring 210 do not define any slots to receive and engage any portion of the blade 200. Instead, the slot 212 is closed by a front wall 212c and an end wall 212d, but defines an open, unobstructed rear passage 212e into which the spring end 210a is freely inserted and from which it is freely removed. Likewise, the slot 214 is closed by the front wall 214c and the end wall 214d, but defines an open, unobstructed rear passage 214e into which the spring end 210b is freely inserted and from which it is freely removed. The spring 210 is retained in its operative position in the slots 212, 214, by the bracket base wall 124 (FIG. 1) or other surface that lies adjacent the open passages 212e, 214e of the slots 212, 214, respectively. It should be appreciated that the sole purpose of the front wall 212c is to retain spring end 210a and it is not meant to add strength to the end wall 212d. Accordingly, the preferred height of the wall 212c, relative to end wall 212d, should be no greater than is required to retain the spring end 210a. As with the first embodiment of the present invention, it is contemplated that multiple ribs 260 may beneficially be used with this second embodiment.

The invention has been described with reference to preferred embodiments. Modifications and alterations will occur to those of ordinary skill in the art to which the invention pertains. It is intended that the invention be construed as encompassing all such modifications and alterations insofar as they fall within the scope of the appended claims as interpreted literally and/or according to the doctrine of equivalents.

Having thus described the preferred embodiments, what is claimed is:

1. A blade and spring sub-assembly apparatus for use in a chain tensioner of a chain drive system, said chain tensioner sub-assembly apparatus comprising:
    a blade having first and second opposite end portions joined together by a central portion, said blade defining an exterior chain guide surface adapted for slidingly abutting an associated chain of an associated chain drive system;
    a tensioning spring connected to said blade, said spring having opposite first and second ends located respectively adjacent said first and second opposite end portions of said blade, said spring contacting and exerting a biasing force on said central portion of said blade;
    a hub defined by said first end portion of said blade, said hub connected to said central portion of said blade by a first end wall and defining a through-bore adapted for receipt of an associated pin for pivotably connecting said blade to an associated mounting bracket; and,
    a rib projecting outwardly from said first end wall in a direction moving away from said second end portion of said blade.

2. The apparatus as set forth in claim 1, wherein said first end of said rib is smoothly blended into said exterior chain guide surface.

3. The apparatus as set forth in claim 2, wherein said second end of said rib is smoothly blended into said hub.

4. The apparatus as set forth in claim 3, wherein said rib, at an outermost end that is spaced a maximum distance outwardly away from said first end wall, defines a smoothly curved outermost surface.

5. The apparatus as set forth in claim 1, wherein blade defines a rear face adapted to lie adjacent the associated mounting bracket and defines a front face opposite said rear face, and wherein said rib is centrally located between said front and rear faces.

6. The apparatus as set forth in claim 1, wherein said blade defines a first slot adapted for receipt of said first end of said tensioning spring and defines a second slot adapted for receipt of said second end of said tensioning spring, wherein said first end wall separates said rib from said first slot.

7. The apparatus as set forth in claim 6, wherein said first slot is defined by a first floor surface, a first ceiling surface spaced from said first floor surface and said first end wall, said first end wall extending between said first floor surface and said first ceiling surface at a closed end of said first slot, and wherein a maximum height of said rib relative to said first end wall is generally aligned with said first slot.

8. The apparatus as set forth in claim 7, further comprising:
    a first projection located in said first slot and projecting outwardly from said first floor surface toward said first ceiling surface, said first end of said tensioning spring defining a first slot adapted for receipt of said first projection when said first end of said tensioning spring is located in said first slot.

9. The apparatus as set forth in claim 6, wherein said second slot is defined by a second floor surface, a second ceiling surface spaced from said second floor surface and a second end wall, said second end wall extending between said second floor surface and said second ceiling surface at a closed end of said second slot.

10. The apparatus as set forth in claim 9, further comprising:
    a second projection located in said second slot and projecting outwardly from said second floor surface toward said second ceiling surface, said second end of said tensioning spring defining a second slot adapted for receipt of said second projection when said second end of said tensioning spring is located in said second slot.

11. The apparatus as set forth in claim 1, wherein said blade is defined from a material comprising one of a plastic and a filled plastic.

12. A chain tensioner apparatus comprising:
    a mounting bracket adapted for connection to an associated engine block, said mounting bracket defining a pivot point and a support surface;
    a blade comprising: (i) first and second opposite end portions joined together by a central portion; (ii) a hub defined by said first end portion; and, (iii) a first end wall connecting said hub to said central portion, said hub of said blade pivotably connected to said bracket adjacent said pivot point and said second end of said blade abutting said support surface, said blade defining an exterior chain guide surface adapted for slidingly abutting an associated chain of an associated chain drive system;
    a tensioning spring connected to said blade, said spring having opposite first and second ends located respectively adjacent said first and second opposite end portions of said blade, said spring contacting and exerting a biasing force on said central portion of said blade; and,
    a rib projecting outwardly away from said first end wall in a direction away from said second end portion.

13. The chain tensioner apparatus as set forth in claim 12, wherein said first end of said rib is smoothly blended into said exterior chain guide surface.

14. The apparatus as set forth in claim 13, wherein said second end of said rib is smoothly blended into said hub.

15. The apparatus as set forth in claim 14, wherein said rib, at an outermost end that is spaced a maximum distance outwardly away from said first end wall, defines a smoothly curved outermost surface.

16. The apparatus as set forth in claim 12, wherein blade defines a rear face adapted to lie adjacent the mounting bracket and defines a front face opposite said rear face, and wherein said rib is centrally located between said front and rear faces.

17. The apparatus as set forth in claim 12, wherein said blade defines a first slot adapted for receipt of said first end of said tensioning spring and defines a second slot adapted for receipt of said second end of said tensioning spring, wherein said first end wall is located between said first slot and said rib.

18. The apparatus as set forth in claim 17, wherein said first slot is defined by a first floor surface, a first ceiling surface spaced from said first floor surface and said first end wall, said first end wall extending between said first floor surface and said first ceiling surface at a closed end of said first slot, and wherein a maximum height of said rib relative to said first end wall is generally aligned with said first slot.

19. The apparatus as set forth in claim 18, further comprising:
    a first projection located in said first slot and projecting outwardly from said first floor surface toward said first ceiling surface, said first end of said tensioning spring defining a first slot adapted for receipt of said first projection when said first end of said tensioning spring is located in said first slot.

20. The apparatus as set forth in claim 17, wherein said second slot is defined by a second floor surface, a second ceiling surface spaced from said second floor surface and a second end wall, said second end wall extending between said second floor surface and said second ceiling surface at a closed end of said second slot.

21. The apparatus as set forth in claim 20, further comprising:

a second projection located in said second slot and projecting outwardly from said second floor surface toward said second ceiling surface, said second end of said tensioning spring defining a second slot adapted for receipt of said second projection when said second end of said tensioning spring is located in said second slot.

22. The apparatus as set forth in claim 12, wherein said blade is defined from a material comprising one of a plastic and a filled plastic.

\* \* \* \* \*